US010279477B2

(12) United States Patent
Chen et al.

(10) Patent No.: US 10,279,477 B2
(45) Date of Patent: May 7, 2019

(54) AUTOMATED SMART BOOK INVENTORY AND SHELVING ROBOT BASED ON RFID TECHNOLOGY

(71) Applicant: NANJING UNIVERSITY, Nanjing (CN)

(72) Inventors: Lijun Chen, Nanjing (CN); Yin Li, Nanjing (CN); Qingpu Shi, Nanjing (CN); Linghao Wan, Nanjing (CN); Xi Chen, Nanjing (CN); Yuanjie Luo, Nanjing (CN); Afan Zeng, Nanjing (CN); Jiaqi Huang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 15/739,054

(22) PCT Filed: Jun. 29, 2016

(86) PCT No.: PCT/CN2016/087627
§ 371 (c)(1),
(2) Date: Dec. 21, 2017

(87) PCT Pub. No.: WO2017/128612
PCT Pub. Date: Aug. 3, 2017

(65) Prior Publication Data
US 2018/0186003 A1    Jul. 5, 2018

(30) Foreign Application Priority Data
Jan. 25, 2016 (CN) .......................... 2016 1 0051583

(51) Int. Cl.
*B25J 9/16* (2006.01)
*G06K 7/10* (2006.01)
(Continued)

(52) U.S. Cl.
CPC ............. *B25J 9/1669* (2013.01); *B25J 5/007* (2013.01); *B25J 9/162* (2013.01); *B25J 9/1664* (2013.01);
(Continued)

(58) Field of Classification Search
CPC .......................... B25J 9/1669; G06K 7/10316
See application file for complete search history.

(56) References Cited

U.S. PATENT DOCUMENTS 10,138,060 B1 * 11/2018 Mantha ................. G05B 15/02
2007/0124024 A1 * 5/2007 Okamoto ................ B25J 5/007
700/245

(Continued)

FOREIGN PATENT DOCUMENTS

CN            101064026 A   * 10/2007

*Primary Examiner* — Thomas Randazzo
(74) *Attorney, Agent, or Firm* — CBM Patent Consulting, LLC

(57) ABSTRACT

An automatic and intelligent book checking and shelving robot based on the RFID technology, including an RFID system used for identifying book information, a controllable lifting device used for checking books, a navigation sensor for providing a locating navigation function and a four-wheel omni-directional mobile platform for driving the equipment to move. The present invention mainly uses the automatic identification technology and the radio frequency phase technology in the RFID technology, and the machine automation technology to realize an automatic and intelligent book checking and shelving function, including an automatic whole-library book checking function and an automatic whole-library book shelving function.

10 Claims, 7 Drawing Sheets

(51) Int. Cl.
*G05D 1/02* (2006.01)
*B25J 5/00* (2006.01)
*B25J 11/00* (2006.01)
*G06Q 10/08* (2012.01)

(52) U.S. Cl.
CPC ........... *B25J 9/1697* (2013.01); *B25J 11/008* (2013.01); *G05D 1/024* (2013.01); *G05D 1/0225* (2013.01); *G05D 1/0231* (2013.01); *G05D 1/0259* (2013.01); *G06K 7/10316* (2013.01); *G06K 7/10376* (2013.01); *G06K 7/10445* (2013.01); *G06Q 10/08* (2013.01); *G05D 2201/0216* (2013.01); *Y10S 901/01* (2013.01); *Y10S 901/47* (2013.01)

(56) References Cited

U.S. PATENT DOCUMENTS

| | | | |
|---|---|---|---|
| 2014/0262979 A1* | 9/2014 | Bonora | B07C 5/00 209/577 |
| 2015/0057792 A1* | 2/2015 | Zhang | A47B 63/00 700/214 |
| 2016/0236867 A1* | 8/2016 | Brazeau | B65G 1/1378 |

* cited by examiner

AUTOMATED SMART BOOK INVENTORY AND SHELVING ROBOT BASED ON RFID TECHNOLOGY

This application is the U.S. national phase of International Application No. PCT/CN2016/087627 filed on 29 Jun. 2016 which designated the U.S. and claims priority to Chinese Application No. CN201610051583.X filed on 25 Jan. 2016, the entire contents of each of which are hereby incorporated by reference.

FIELD OF THE INVENTION

The present invention relates to the field of intelligent RFID technology application, and in particular to an automatic and intelligent book checking and shelving robot based on the RFID technology.

BACKGROUND OF THE INVENTION

Radio frequency identification RFID (Radio Frequency Identification) technology, also known as wireless radio frequency identification, is a communication technology that identifies specific targets and reads and writes relevant data via radio signals without establishing mechanical or optical contact between an identification system and the specific targets. RFID reader-writers are also divided into mobile RFID reader-writers and fixed RFID reader-writers, and the RFID technology is widely used at present, such as libraries, access control systems, food safety traceability and the like. However, any fully automatic and intelligent book checking and shelving robot does not appear so far.

SUMMARY OF THE INVENTION

Objective of the invention: the technical problem to be solved by the present invention is to provide an automatic and intelligent book checking and shelving robot based on the RFID technology in view of the shortcomings in the prior art.

In order to solve the above technical problems, the present invention discloses an automatic and intelligent book checking and shelving robot based on the RFID technology, including an equipment main body, an all-in-one machine and a controllable lifting device arranged on the equipment main body, and a four-wheel omni-directional mobile platform arranged at the bottom of the inner side of the equipment main body, wherein the four-wheel omni-directional mobile platform is encoded and controlled by the all-in-one machine, and an RFID antenna capable of moving up and down is arranged on the controllable lifting device; and an RFID reader connected to the all-in-one machine and more than one bookshelf layer are arranged in the equipment main body, more than one RFID antenna are correspondingly arranged in each bookshelf layer, and all the RFID antennas are connected to the RFID reader.

In the present invention, the controllable lifting device includes a lifting device slide block and a lifting device guide rail, the lifting device guide rail is fixed to the back of the equipment main body, the lifting device slide block is arranged in the lifting device guide rail, the lifting device guide rail is controlled by the all-in-one machine to realize the ascending and descending of the lifting device slide block, and more than one RFID antenna are arranged on the lifting device slide block.

In the present invention, the all-in-one machine includes a touch display, thereby facilitating operation, control and implementation.

In the present invention, two RFID antennas are arranged on the controllable lifting device, which are respectively a first RFID antenna located on an upper end and a second RFID antenna located on a lower end.

In the present invention, a magnetic navigation sensor is arranged at the bottom of the four-wheel omni-directional mobile platform.

In the present invention, a bottom inner cabin is arranged at the lower end of the equipment main body, and the RFID reader is located in the bottom inner cabin.

In the present invention, a rechargeable portable power source is arranged in the bottom inner cabin for providing power supply for all the energy consumption hardware.

In the present invention, a laser navigation sensor connected with the four-wheel omni-directional mobile platform is arranged in the bottom inner cabin.

In the present invention, the all-in-one machine is fixed to the top of the equipment main body.

The present invention further provides an intelligent book shelving method, including the following steps:
step 1, placing a book configured with an RFID tag in the bookshelf layer of the robot;
step 2, reading the RFID tag of the book by using the RFID antenna located in the bookshelf layer;
step 3, transmitting the obtained information of the RFID tag to the all-in-one machine by using the RFID reader, matching book information in a database according to the obtained information of the RFID tag so as to identify the book placed by the robot in the bookshelf layer, and obtaining book position information from the database, wherein the book position information comprises a bookshelf number and a bookshelf layer number of the book;
step 4, locating the current position of the robot via the navigation sensor, generating an optimal path of book shelving according to a locating result and the obtained book position information, and transmitting the information of the optimal path to the four-wheel omni-directional mobile platform;
step 5, starting the four-wheel omni-directional mobile platform, and causing the four-wheel omni-directional mobile platform to move according to the obtained optimal path; and
step 6, in a travelling process, once the robot enters a new bookshelf field, performing detection, if the bookshelf contains a part of books in the bookshelf layer of the robot, causing the robot to automatically stop, and prompting the information of the books to be placed on the bookshelf, after the book shelving is completed, causing the robot to continue to move, and reciprocating until arriving at the destination of the path.

In the present invention, an automatic whole-library book checking method is included, including the following steps:
step 1, locating the current specific position of the robot via the navigation sensor, meanwhile generating an optimal path of traversing all the bookshelves according to the locating result, and transmitting the information of the optimal path to the four-wheel omni-directional mobile platform;
step 2, starting the four-wheel omni-directional mobile platform, and causing the four-wheel omni-directional mobile platform to move according to the obtained optimal path;
step 3, starting the first RFID antenna and the second RFID antenna located on the controllable lifting device, and causing the first RFID antenna and the second RFID antenna to continuously scan the book information in a moving process;

step 4, in a book scanning process, determining a corresponding checking bookshelf number according to the current locating information of the robot, determining a specific number of checking bookshelf layers according to the current lifting height of the controllable lifting device, and determining a current front and back sequence relation among the books according to the time information and phase information when books are scanned; and step 5, comparing the actual book information obtained during scanning with the original book information obtained from a database server so as to determine the book as a correct book or a wrong shelf book or a lost book, and feeding back a checking result to the user.

In the present invention, both the laser navigation sensor and the magnetic navigation sensor are prior art.

Beneficial effects: the automatic and intelligent book checking and shelving robot based on the RFID technology in the present invention can automatically perform a checking operation on the books, and the robot can check books on bookshelf layers with different heights through the controllable lifting device and the RFID antennas on the device. Equipment locating is realized by using the four-wheel omni-directional mobile platform, the laser navigation sensor and the magnetic navigation sensor, and the current book checking position is displayed on a display screen.

Besides, the robot brings about great convenience for the book shelving operation. The RFID antennas arranged in the upper layer bookshelf and the lower layer bookshelf can sense the information of the books placed on a book placement platform in real time and locate the bookshelf by means of the locating function of the laser navigation sensor and the magnetic navigation sensor. Compared with the traditional RFID checking and shelving equipment, the automatic and intelligent book checking and shelving robot based on the RFID technology can greatly improve the working efficiency of book checking and book shelving.

The methods used in locating and navigation involved in the present invention are implemented by using the prior art.

BRIEF DESCRIPTION OF THE DRAWINGS

The present invention will be further described below with reference to the accompanying drawings and specific embodiments, and the advantages of the foregoing and/or other aspects of the present invention will become clearer.

DETAILED DESCRIPTION OF THE EMBODIMENTS

Figure 1:
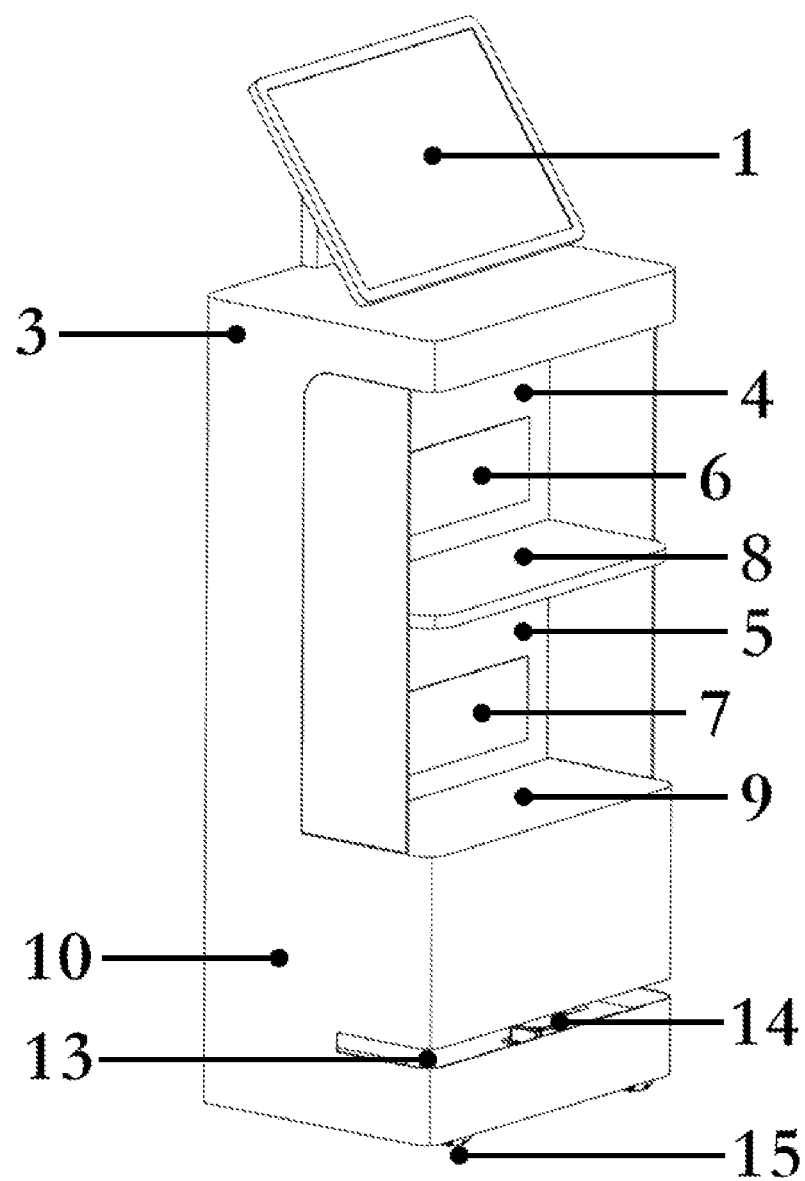
FIG. 1 is an oblique view of the present invention.
Figure 2:
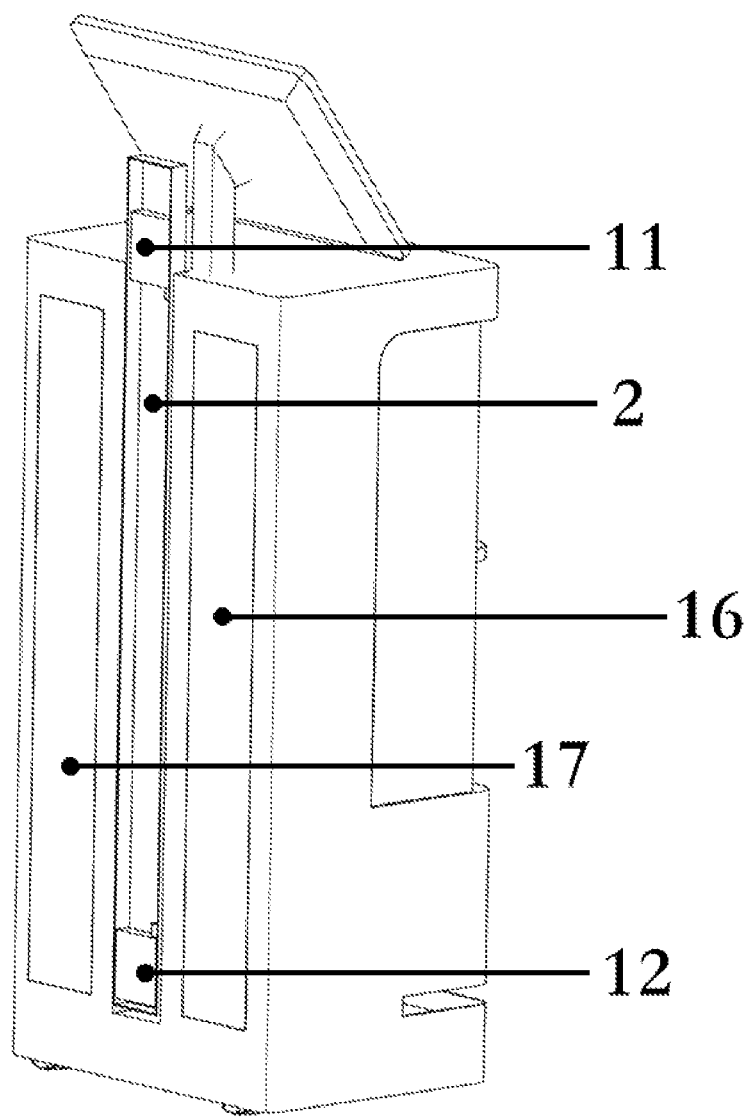
FIG. 2 is an oblique view of the present invention.
Figure 3:
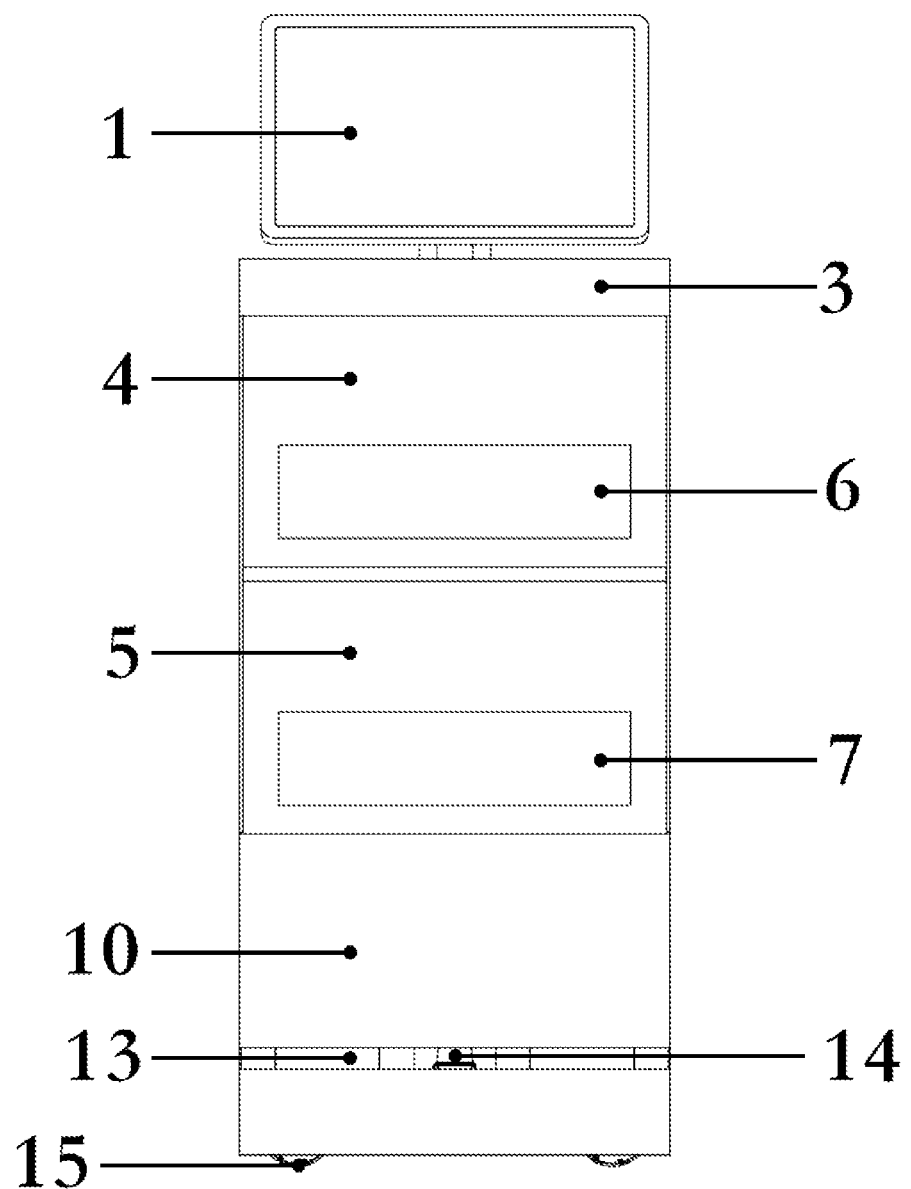
FIG. 3 is a front view of the present invention.
Figure 4:
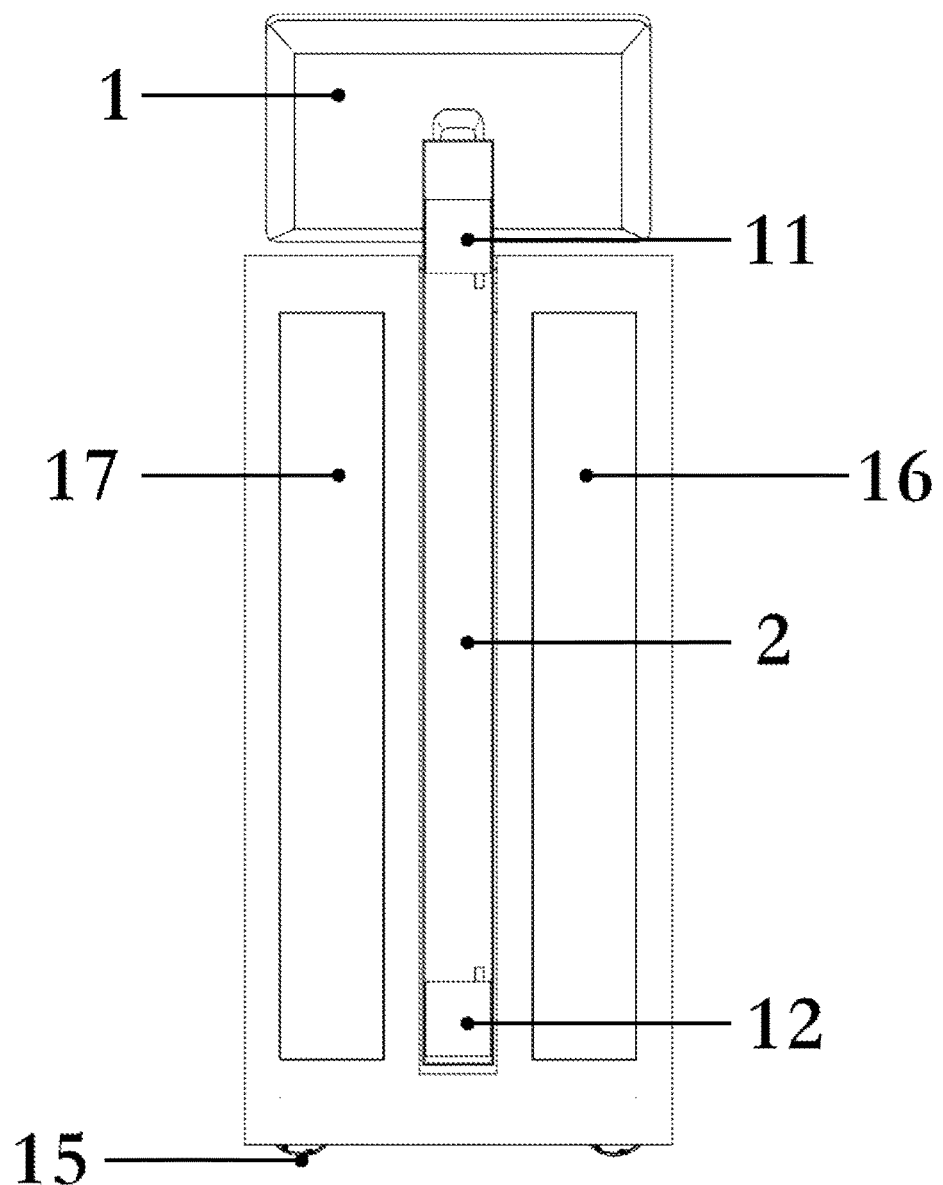
FIG. 4 is a rear view of the present invention.
Figure 5:
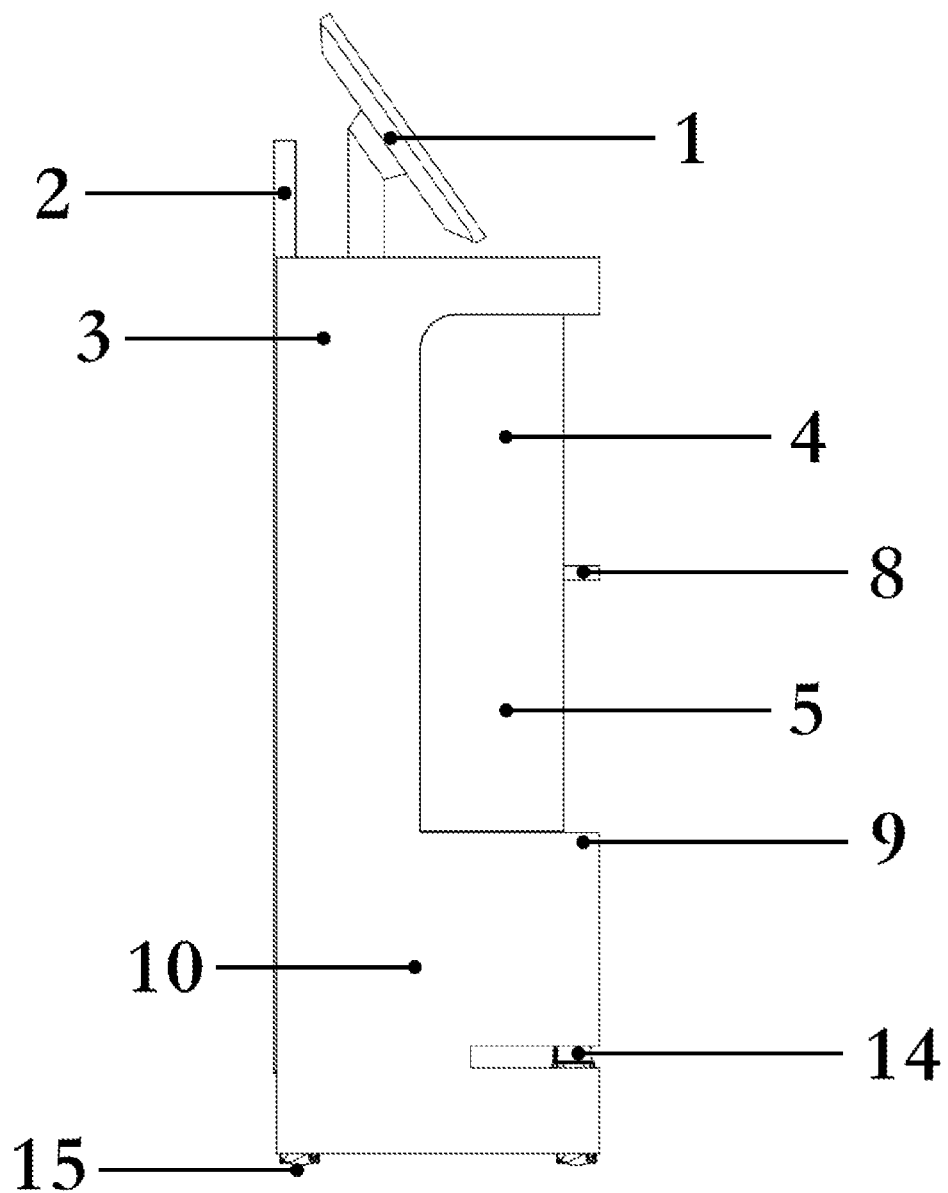
FIG. 5 is a left view of the present invention.
Figure 6:
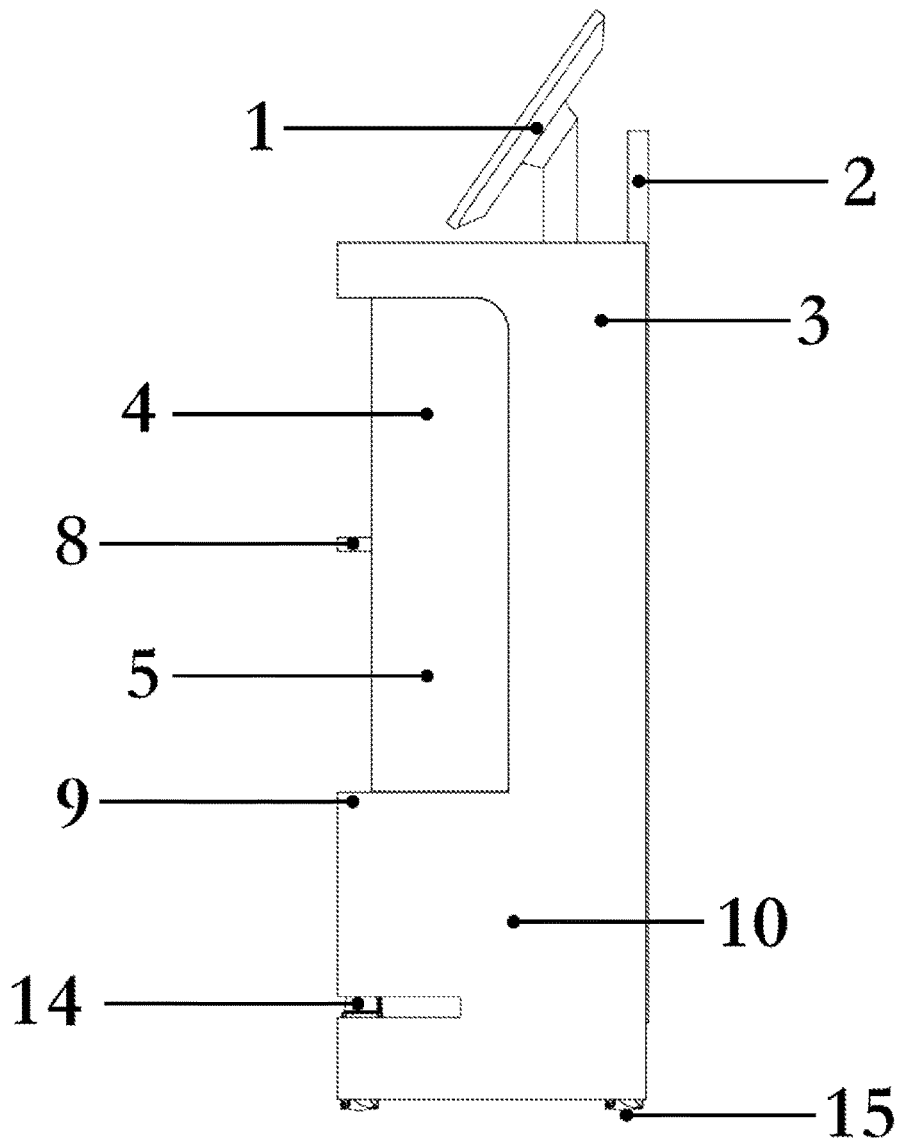
FIG. 6 is a right view of the present invention.

The present invention will be illustrated below in detail in combination with the drawings. As shown in FIG. 1 to FIG. 6, the present invention includes an all-in-one machine 1, a controllable lifting device 2, an equipment main body 3, an upper layer bookshelf 4, a lower layer bookshelf 5, an upper layer organic glass division plate 6, a lower layer organic glass division plate 7, an upper layer book placement platform 8, a lower layer book placement platform 9, a bottom inner cabin 10, a first RFID antenna 11, a second RFID antenna 12, a four-wheel omni-directional mobile platform 13, a laser navigation sensor 14, omni-directional wheels 15, a first door panel 16 and a second door panel 17, wherein the all-in-one machine 1 is fixed to a top platform of the equipment main body 3, and the equipment main body 3 includes the upper layer bookshelf 4, the lower layer bookshelf 5 and the bottom inner cabin 10 from top to bottom; the upper layer organic glass division plate 6 and the upper layer book placement platform 8 are arranged in the upper layer bookshelf 4, the lower layer organic glass division plate 7 and the lower layer book placement platform 9 are arranged in the lower layer bookshelf 5, a third RFID antenna, a fourth RFID antenna and a fifth RFID antenna are arranged on the back of the upper layer organic glass division plate 6, a sixth RFID antenna, a seventh RFID antenna and an eighth RFID antenna are arranged on the back of the lower layer organic glass division plate 7, and the RFID antennas can sense the information of books in the bookshelf layers; an RFID reader, the four-wheel omni-directional mobile platform 13, the laser navigation sensor 14 and a rechargeable portable power source are arranged in the bottom inner cabin 10, the RFID reader performs data interaction with the all-in-one machine 1 through a network cable, the four-wheel omni-directional mobile platform 13 is assembled with the omni-directional wheels 15, and the rechargeable portable power source provides power supply for all the energy consumption hardware; and the hardware devices in the equipment main body can be maintained or changed by opening the first door panel 16 and the second door panel 17.

The controllable lifting device 2 includes a lifting device bracket, a lifting device slide block and a lifting device guide rail, the lifting device bracket is fixed to the back of the equipment main body 3, the lifting device slide block is fixed to an upper end of the lifting device bracket, the lifting device guide rail is connected to the lifting device slide block, the first RFID antenna 11 and the second RFID antenna 12 are fixed to upper and lower ends of the lifting device guide rail, the lifting device guide rail realizes a lifting task on the lifting device slide block through mechanical control so as to drive the first RFID antenna 11 and the second RFID antenna 12 to realize upper and lower lifting operations, and thus the books located on bookshelves with different heights can be checked.

Figure 7:
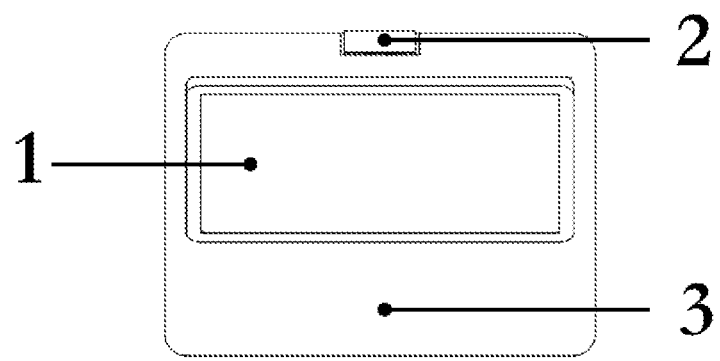
FIG. 7 is a top view of the present invention.
Figure 8:
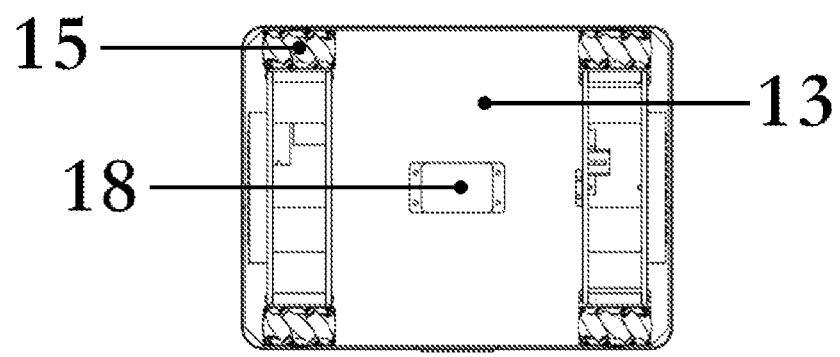
FIG. 8 is an upward view of the present invention.

As shown in FIG. 7 and FIG. 8, four omni-directional wheels 15 are arranged on two sides of the four-wheel omni-directional mobile platform 13, and a magnetic navigation sensor 18 is arranged at the bottom.

In the present invention, the laser navigation sensor 14 performs ranging and locating by transmitting and receiving laser pulse signals, and the magnetic navigation sensor 18 performs ranging and locating by transmitting and receiving magnetic signals so as to determine the position of the equipment on the bookshelf and plan a moving path.

When the robot disclosed by the present invention is used, and needs to accomplish a book checking task, the robot can automatically plan the path by means of the laser navigation sensor 14 and the magnetic navigation sensor 18, depart from the current position to traverse all the bookshelves requiring book checking, and complete all the book checking tasks in a moving process. When a robot passes by one bookshelf, the first RFID antenna 11 and the second RFID antenna 12 on the two ends of the controllable lifting device 2 can be used for performing the checking task of two layers of books, and the lifting device automatically raises a unit distance to check the books on the previous layer of bookshelf after the task is completed, and the reciprocating is executed until all the books are checked. The specific implementation steps are as follows:

step 1, locating the current specific position of the robot via the navigation sensor, meanwhile generating an optimal path of traversing all the bookshelves according to the locating result, and transmitting the information of the optimal path to the four-wheel omni-directional mobile platform 13;

step 2, starting the four-wheel omni-directional mobile platform 13 to drive the omni-directional wheels 15 to move according to the obtained optimal path;

step 3, starting the first RFID antenna 11 and the second RFID antenna 12 located on the controllable lifting device 2, and causing the first RFID antenna and the second RFID antenna to continuously scan the book information in a moving process;

step 4, in a book scanning process, determining a specific checking bookshelf number according to the current locating information of the robot, determining a specific number of checking bookshelf layers according to the current lifting height of the controllable lifting device 2, and determining a current front and back sequence relation among the books according to the time information and phase information when books are scanned; and step 5, comparing the actual book information obtained during scanning with the original book information obtained from a database server so as to determine the book as a correct book or a wrong shelf book or a lost book, feeding back a checking result to the user, and displaying the checking result on the all-in-one machine 1.

When the robot disclosed by the present invention is used, and needs to accomplish a book shelving task, the third RFID antenna to the fifth RFID antenna can sense the information of the books located in the upper layer bookshelf 4, the sixth RFID antenna to the eighth RFID antenna can sense the information of the books located in the lower layer bookshelf 5, and then the robot automatically plans the path by means of the laser navigation sensor 14 and the magnetic navigation sensor 18 and advances to the position of the bookshelf requiring shelving, after arriving at the destination, the robot prompts the shelving personnel about the information of the to-be-shelved books, thereby improving the working efficiency of book shelving. The specific implementation steps are as follows:

step 1, placing books configured with RFID tags in the upper layer book placement platform 8 of the upper layer bookshelf 4 or the lower layer book placement platform 9 of the lower layer bookshelf 5 of the robot;

step 2, reading the RFID tags of the books by using the RFID antennas located on the backs of the upper layer organic glass division plate 6 and the lower layer organic glass division plate 7;

step 3, transmitting the obtained information of the RFID tags to the all-in-one machine 1 by using the RFID reader, matching book information in a database according to the obtained information of the RFID tags so as to identify the books placed by the robot in the bookshelf layers, and obtaining book position information from the database, wherein the book position information includes bookshelf numbers and bookshelf layer numbers of the books;

step 4, locating the current position of the robot via the navigation sensor, generating an optimal path of book shelving according to a locating result and the obtained book position information, and transmitting the information of the optimal path to the four-wheel omni-directional mobile platform (13);

step 5, starting the four-wheel omni-directional mobile platform (13), and causing the four-wheel omni-directional mobile platform to move according to the obtained optimal path; and step 6, in a travelling process, once the robot enters a new bookshelf field, performing detection, if the bookshelf contains a part of books in the bookshelf layer of the robot, causing the robot to automatically stop, and prompting the information of the books to be placed on the bookshelf, after the book shelving is completed, causing the robot to continue to move, and reciprocating until arriving at the destination of the path.

The present invention provides an automatic and intelligent book checking and shelving robot based on the RFID technology, there are many ways and means for implementing the technical solutions, the foregoing descriptions are merely preferred implementation of the present invention, and it should be noted that, for those of ordinary skill in the art, various improvements and modifications can be made without departing from the principle of the present invention, and these improvements and modifications shall also fall within the protection scope of the present invention. The components that are not clearly defined in the present embodiment can be implemented by the prior art.

What is claimed is:

1. An automatic and intelligent book checking and shelving robot based on RFID technology, comprising an equipment main body (3), an all-in-one machine (1) and a controllable lifting device (2) arranged on the equipment main body (3), and a four-wheel omni-directional mobile platform (13) arranged at bottom of inner side of the equipment main body (3), wherein the four-wheel omni-directional mobile platform (13) is controlled by the all-in-one machine (1), and an RFID antenna capable of moving up and down is arranged on the controllable lifting device (2); and an RFID reader connected to the all-in-one machine (1) and more than one bookshelf layer are arranged in the equipment main body (3), more than one RFID antenna is correspondingly arranged in each bookshelf layer, and all the RFID antennas are connected to the RFID reader.

2. The automatic and intelligent book checking and shelving robot based on the RFID technology of claim 1, wherein the controllable lifting device (2) comprises a lifting device slide block and a lifting device guide rail, the lifting device guide rail is fixed to back of the equipment main body (3), the lifting device slide block is arranged in the lifting device guide rail, the lifting device guide rail is controlled by the all-in-one machine to realize ascending and descending of the lifting device slide block, and more than one RFID antenna are arranged on the lifting device slide block.

3. The automatic and intelligent book checking and shelving robot based on the RFID technology of claim 2, wherein two RFID antennas are arranged on the controllable lifting device (2), which are respectively a first RFID antenna (11) located on an upper end and a second RFID antenna (12) located on a lower end.

4. The automatic and intelligent book checking and shelving robot based on the RFID technology of claim 1, wherein a magnetic navigation sensor (18) is arranged at bottom of the four-wheel omni-directional mobile platform (13).

5. The automatic and intelligent book checking and shelving robot based on the RFID technology of claim 1, wherein the RFID reader performs data interaction with the all-in-one machine through a network cable, the four-wheel omni-directional mobile platform (13) comprises omni-directional wheels (15) located on bottom of the equipment main body (3).

6. The automatic and intelligent book checking and shelving robot based on the RFID technology of claim 1, wherein a bottom inner cabin (10) is arranged at lower end of the equipment main body (3), and the RFID reader is located in the bottom inner cabin (10).

7. The automatic and intelligent book checking and shelving robot based on the RFID technology of claim 1, wherein a laser navigation sensor (14) connected with the four-wheel omni-directional mobile platform (13) is arranged in the bottom inner cabin (10).

8. The automatic and intelligent book checking and shelving robot based on the RFID technology of claim 1, wherein the all-in-one machine (1) is fixed to top of the equipment main body (3).

9. An automatic and intelligent book checking and shelving robot based on RFID technology, comprising an intelligent book shelving method, comprising the following steps:
    step 1, placing a book configured with an RFID tag in bookshelf layer of the robot;
    step 2, reading the RFID tag of the book by using an RFID antenna located in the bookshelf layer;
    step 3, transmitting obtained information of the RFID tag to an all-in-one machine (1) by using a RFID reader, matching book information in a database according to the obtained information of the RFID tag so as to identify the book placed by the robot in the bookshelf layer, and obtaining book position information from the database, wherein the book position information comprises a bookshelf number and a bookshelf layer number of the book;
    step 4, locating current position of the robot via a navigation sensor, generating an optimal path of book shelving according to a locating result and the obtained book position information, and transmitting information of the optimal path to a four-wheel omni-directional mobile platform (13);
    step 5, starting the four-wheel omni-directional mobile platform (13), and causing the four-wheel omni-directional mobile platform to move according to obtained optimal path; and
    step 6, in a travelling process, once the robot enters a bookshelf field, performing detection, if the bookshelf field contains a part of books in the bookshelf layer of the robot, causing the robot to automatically stop, and prompting the information of the books to be placed on the bookshelf, after the book shelving is completed, causing the robot to continue to move, and reciprocating until arriving at destination of a path.

10. The automatic and intelligent book checking and shelving robot based on the RFID technology of claim 9, comprising an automatic whole-library book checking method, comprising the following steps:
    step 1, locating a current specific position of the robot via the navigation sensor, meanwhile generating an optimal path of traversing all bookshelves according to the locating result, and transmitting information of the optimal path to the four-wheel omni-directional mobile platform (13);
    step 2, starting the four-wheel omni-directional mobile platform (13), and causing the four-wheel omni-directional mobile platform to move according to the obtained optimal path;
    step 3, starting a first RFID antenna (11) and a second RFID antenna (12) located on the controllable lifting device (2), and causing the first RFID antenna and the second RFID antenna to continuously scan book information in a moving process;
    step 4, in a book scanning process, determining a corresponding checking bookshelf number according to current locating information of the robot, determining a specific number of checking bookshelf layers according to current lifting height of a controllable lifting device (2), and determining a current front and back sequence relation among the books according to time information and phase information when books are scanned; and
    step 5, comparing actual book information obtained during scanning with original book information obtained from a database server so as to determine the book as a correct book or a wrong shelf book or a lost book, and feeding back a checking result to an user.

\* \* \* \* \*